(12) United States Patent
Kappes

(10) Patent No.: US 9,272,263 B2
(45) Date of Patent: Mar. 1, 2016

(54) SAND BED DOWNDRAFT FURNACE AND ACTIVATED CARBON SCRUBBER

(71) Applicant: Kappes, Cassiday & Associates, Reno, NV (US)

(72) Inventor: Daniel W. Kappes, Reno, NV (US)

(73) Assignee: Kappes, Cassiday & Associates, Reno, NV (US)

( * ) Notice: Subject to any disclaimer, the term of this patent is extended or adjusted under 35 U.S.C. 154(b) by 792 days.

(21) Appl. No.: 13/625,706

(22) Filed: Sep. 24, 2012

(65) Prior Publication Data

US 2014/0087938 A1    Mar. 27, 2014

(51) Int. Cl.

| | |
|---|---|
| *B01J 20/06* | (2006.01) |
| *B01J 20/10* | (2006.01) |
| *B01J 20/34* | (2006.01) |
| *B01J 20/20* | (2006.01) |
| *B01J 20/28* | (2006.01) |
| *B01D 53/64* | (2006.01) |
| *B01D 53/78* | (2006.01) |
| *B01D 53/96* | (2006.01) |
| *F27B 15/02* | (2006.01) |

(52) U.S. Cl.
CPC ............. *B01J 20/3416* (2013.01); *B01D 53/64* (2013.01); *B01D 53/78* (2013.01); *B01D 53/96* (2013.01); *B01J 20/06* (2013.01); *B01J 20/10* (2013.01); *B01J 20/103* (2013.01); *B01J 20/20* (2013.01); *B01J 20/28009* (2013.01); *B01J 20/28052* (2013.01); *F27B 15/02* (2013.01); *B01D 2253/102* (2013.01); *B01D 2257/602* (2013.01); *F23G 2209/30* (2013.01); *F23G 2900/50002* (2013.01)

(58) Field of Classification Search
None
See application file for complete search history.

(56) References Cited

U.S. PATENT DOCUMENTS

| | | | |
|---|---|---|---|
| 1,103,196 A | 7/1914 | Greenawalt | |
| 1,140,350 A | 5/1915 | Beach | |
| 2,215,079 A | 9/1940 | Hess | |
| 3,261,463 A | 7/1966 | Eveson et al. | |
| 3,867,261 A * | 2/1975 | Solano | C10B 7/02 202/100 |
| 4,011,129 A * | 3/1977 | Tomlinson, II | D21C 11/12 162/30.11 |
| 4,225,443 A | 9/1980 | Harris et al. | |
| 4,615,993 A * | 10/1986 | Schirrmacher | B01J 8/40 502/34 |
| 4,685,220 A | 8/1987 | Meenan et al. | |
| 4,867,848 A * | 9/1989 | Cordier | C10B 1/04 201/19 |
| 5,292,695 A * | 3/1994 | Galloway | B01J 20/3466 502/53 |
| 5,395,596 A * | 3/1995 | Winkin | F23C 10/20 110/245 |
| 5,437,845 A * | 8/1995 | Brioni | C01B 31/10 422/151 |
| 5,682,828 A * | 11/1997 | Phalen | F23C 10/10 110/245 |

(Continued)

*Primary Examiner* — Colleen Dunn
(74) *Attorney, Agent, or Firm* — Leech Tishman Fuscaldo & Lampl; Kenneth D'Alessandro, Esq.

(57) ABSTRACT

A device for roasting spent activated carbon, waste sludges, or other organic wastes, includes a downdraft bed furnace, a first adsorber fluidly coupled to the furnace including a closed tank of adsorber process solution, a venturi scrubber and a cyclone separator coupled to the tank such that gases are sucked through the venturi and the cyclone separator, liquid effluents from the scrubber and separator falling by gravity into the tank, a second adsorber fluidly coupled to the first adsorber including a closed tank of adsorber liquid, a venturi scrubber and a cyclone separator coupled to the tank such that gases are sucked through the venturi and the cyclone separator, liquid effluents from the scrubber and separator falling by gravity into the tank, the second adsorber configured to remove impurities not removed in the first adsorber; and an exhaust blower fluidly coupled to the second adsorber unit and configured to pull air into the furnace and through the first and second adsorbers.

8 Claims, 3 Drawing Sheets

(56) References Cited

U.S. PATENT DOCUMENTS

| | | | | |
|---|---|---|---|---|
| 5,771,822 A | * | 6/1998 | Rizzon | B09B 3/0066 110/165 A |
| 5,946,342 A | * | 8/1999 | Koslow | C01B 31/088 373/109 |
| 5,964,921 A | * | 10/1999 | Uitvlugt | B01D 53/10 95/13 |
| 5,996,512 A | * | 12/1999 | Morin | C03B 3/02 110/215 |
| 6,061,384 A | * | 5/2000 | Koslow | C01B 31/088 373/109 |
| 6,534,689 B1 | * | 3/2003 | Stankevitch | C10B 49/16 585/241 |
| 2009/0000195 A1 | * | 1/2009 | Graham | C10J 3/30 48/86 R |
| 2009/0199747 A1 | | 8/2009 | Laskowski et al. | |
| 2010/0075830 A1 | * | 3/2010 | Hwang | B01J 20/20 502/56 |
| 2010/0219133 A1 | | 9/2010 | Perez-Cordova | |
| 2012/0111149 A1 | * | 5/2012 | Gharda | C21B 13/0033 75/467 |

* cited by examiner

SAND BED DOWNDRAFT FURNACE AND ACTIVATED CARBON SCRUBBER

BACKGROUND

1. Field of the Invention

The present invention relates to industrial processes involving the use of activated carbon. More particularly, the present invention relates to methods and apparatus for scrubbing activated carbon.

2. The Prior Art

Activated carbon is widely used in the chemical process industry to absorb hazardous materials. In addition, power plants are also turning to adsorption to process exhaust containing hazardous materials. Activated carbon and other adsorbents are being used to capture mercury in these industries. New regulations in the United States are forcing power plants to reduce mercury by 90%. The injection of activated carbon is the route many operators will take. This application of activated carbon requires an increasingly large volume of this material. According to some estimates, the market for activated carbon in the United States will effectively double. According to one source, annual industrial adsorption revenue in NAFTA is about $235 MM per year. In east Asia, the fastest growing region, it is about $430 MM/yr.

One of the problems with activated carbon is that it ends up being converted to fly ash, much of which is sold to be used as a component in cement. The carbon, however, decreases cement strength. One solution for this has been the development of "cement friendly" activated carbon materials. If the activated carbon has been used to absorb mercury, a solution has to be found for removing the mercury before the carbon is incorporated into cement.

BRIEF DESCRIPTION

According to one aspect of the present invention, a downflow hearth furnace with a sacrificial or partially replaced bed of gas-permeable material on the hearth to facilitate removal of the final roasted product and/or to maintain the bed in optimal permeable condition even when it is partially degraded by the roasting reactions. The bed may be formed from silica sand or some other naturally occurring or man-made material that can withstand the temperature of the roasting reaction and will remain inert and not oxidized by the roaster gases. Such materials include, but are not limited to, various classes of naturally occurring rocks composed of silicates, aluminates, or alkaline earth oxides; and man-made materials such as ceramics or refractories. The combustion product gases are pulled down through the charge being roasted, and then through a bed of gas-permeable particles of such natural filtering characteristics to prevent the movement of the fine ash (solids combustion) products from their initial location above the bed. In one embodiment, the bed may be formed from magnetite or some other substance which can be recovered from the products of roasting by magnetic separation means.

In some embodiments, the hearth furnace is a simple one-hearth fixed bed furnace with no internal moving parts, such that roasting and replacement of the reactants and hearth bed are all performed manually. An external manually-controlled gas burner on the top of the furnace provides the heat of reaction (or the initial heat in the case of combustible materials) and an exterior fan exhausts air from below the hearth. In some embodiments, the furnace contains only one non-moving bed and which is operated by removing and replacing the material to be roasted, and/or a portion of the filter bed, as necessary.

The furnace includes a refractory lined metal shell, which may be cylindrical or polygonal in shape, having an integral, non-permeable bottom and an open top and a removable refractory-lined or refractory lid having a set of holes designed to allow the entry of a flame generated by a burner inserted into the top of the lid, and to allow the entry of air to support reaction of the products. An insertable basket seals against the walls of the furnace to prevent excessive short circuiting of air around the basket, and the bottom of which consists of a screen or plenum with small holes to allow downward flow of gases. A replaceable layer of a permeable bed of sand or other material as elsewhere described, located on the basket, to prevent the downward flow of solids. At least one outlet is formed through the side wall of the shell to allow for instrumentation and for the exhaust of the combustion gases from below the bed.

According to another aspect of the present invention, a device for the roasting of spent activated carbon, waste sludges, or other organic wastes includes a furnace at the head or feed end of the system, a first adsorber unit consisting of a closed tank of water, chemical solution, or other inorganic or organic liquid, with a venturi scrubber and a cyclone separator mounted on top of the tank such that the liquid effluents from the scrubber and separator will fall by gravity into the tank; and a connection from the furnace to the inlet of the venturi so that gases are sucked into the venturi then through the cyclone separator; and connections for introducing the adsorber (scrubbing) liquid and for removing excess liquid. The system includes a second adsorber unit essentially identical to the first adsorber unit, which will be operated under slightly different conditions or with a different chemical liquid to effectively remove objectionable impurities which may not have been removed in the first unit. The system may also include more absorber units as necessary to effect acceptable clean up of the gas stream for discharge to the atmosphere. An exhaust fan or blower sufficient to operate the system in an effective manner is employed to pull the gasses from the furnace and through the adsorber units.

The e first unit may be operated with a moderate continuous flow of water or of process solution from elsewhere in the industrial complex, in order to lower the temperature of the process gas stream from the high temperature of combustion in the furnace to a temperature below 100 C, and preferably below 40 C. The second unit may be operated with a recycle stream of cold brine which is cooled by an external chiller, such that the temperature of the process gas stream leaving this unit is low enough so that the vapor pressure of objectionable components is within the limits for atmospheric discharge of gases. The brine in the second unit is maintained at a temperature between −10 and 0 degrees C., with the object of controlling the vapor pressure of mercury in the gas stream.

A device according to the present invention may be employed for the control of mercury vapor discharge from any industrial process gas stream whereby the initial mercury level in the gas stream exceeds regulatory limits, which consists of an adsorber unit (venturi scrubber and cyclone separator mounted on a receiving tank), operating with a chilled brine stream at a temperature between −30 and +15 degrees C., but preferably between −10 and +5 degrees C., in such a manner that the brine is in intimate contact with the gas stream so that it simultaneously chills the gas stream and makes gas-liquid contact to remove mercury vapors to the regulatory limits. The brine may be a simple brine formulated to not freeze at the operating temperature, or it may be a more complex chemical brine which serves to chemically change and/or dissolve the mercury components for improved mercury removal.

The simple manually-operated furnace may be expanded to include multiple hearths such that the carbon can be fed continuously, for example, to center of the top hearth, slowly rabbled out, then back to center on a second hearth, then to the outside (to a discharge port) on a third hearth. Carbon will flow downward from hearth to hearth, gas will flow downward through the beds and out the bottom.

A removal mechanism for the manual furnace removes the ash layer with or without some of the permeable bed, using a scraper or a suction device. Bed material so removed can be cleaned and put back in the furnace, or sent with the ash for further processing. In one specific application, the purpose of ashing the carbon is to remove the carbonaceous components so that the carbon-free ash can be easily smelted for recovery of its metal content, and the material in the permeable sand bed is silica sand or another material which is a normal component of the flux mixture used in the smelting of the ash.

BRIEF DESCRIPTION OF THE DRAWING FIGURES

DETAILED DESCRIPTION

Persons of ordinary skill in the art will realize that the following description of the present invention is illustrative only and not in any way limiting. Other embodiments of the invention will readily suggest themselves to such skilled persons.

Figure 1:
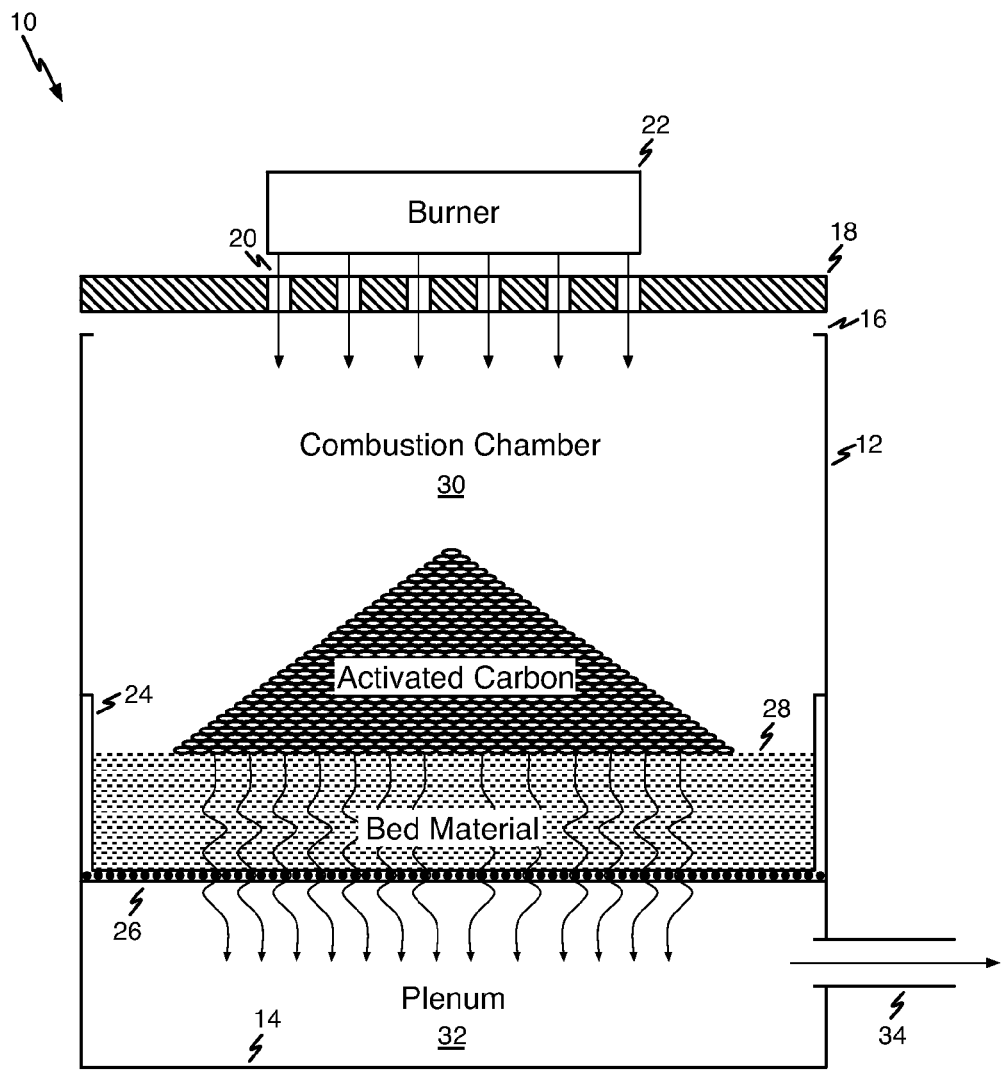
FIG. 1 is a diagram showing an illustrative downdraft furnace that may be employed in accordance with the present invention.

Referring first to FIG. 1, a diagram shows an illustrative downdraft furnace 10 that may be employed in accordance with the present invention. Downdraft furnace 10 is formed from a refractory lined metal shell 12 having an integral, non-permeable bottom 14 and an open top 16.

A removable refractory-lined or refractory lid 18 has a plurality of holes (one designated with reference numeral 20) formed therein to allow entry of a flame generated by a burner 22 inserted into the top of the lid 20, and to allow the entry of air to support reaction of the products. An insertable basket 24 is configured to form a seal against the inner walls of the furnace to essentially prevent short circuiting of air around the basket. The basket has a bottom 26 formed as a screen having holes sized to allow downward flow of gases. In one embodiment of the present invention used to process activated carbon fines, the screen may be a 30 mesh screen formed from Inconel material.

A replaceable layer 28 of a permeable bed material is disposed in the basket and defines a combustion chamber 30 thereabove. The bed material has a granular size small enough to trap the ash solids that remain behind after combustion of the material being processed but larger than the hole size of the screen 26 to prevent the downward flow of solids through the layer of bed material 28. In one illustrative embodiment of the present invention used to process activated carbon fines, the bed material may comprise layer of about 2 inches of #30 silica sand, although this thickness is not critical so long as it is large enough to contain the expected solid ash combustion products.

A region of refractory lined metal shell 12 below the screen defines a plenum 32. At least one outlet 34 is formed in the side wall of the refractory lined metal shell 12 at plenum 32 to allow for coupling to instrumentation and to draw the gaseous combustion products from the plenum 32 below the bed.

Persons of ordinary skill in the art will readily appreciate that materials other than activated carbon may be processed in the downdraft furnace 10 according to the teachings of the present invention. If activated carbon is being processed, it will be able to exhibit self sustained combustion and burner 22 may be turned off after the material has been ignited. Persons of ordinary skill in the art will appreciate that burner 22 may need to remain on during the combustion process where other materials are involved as a function of the nature of the particular material being combusted.

Figure 2:
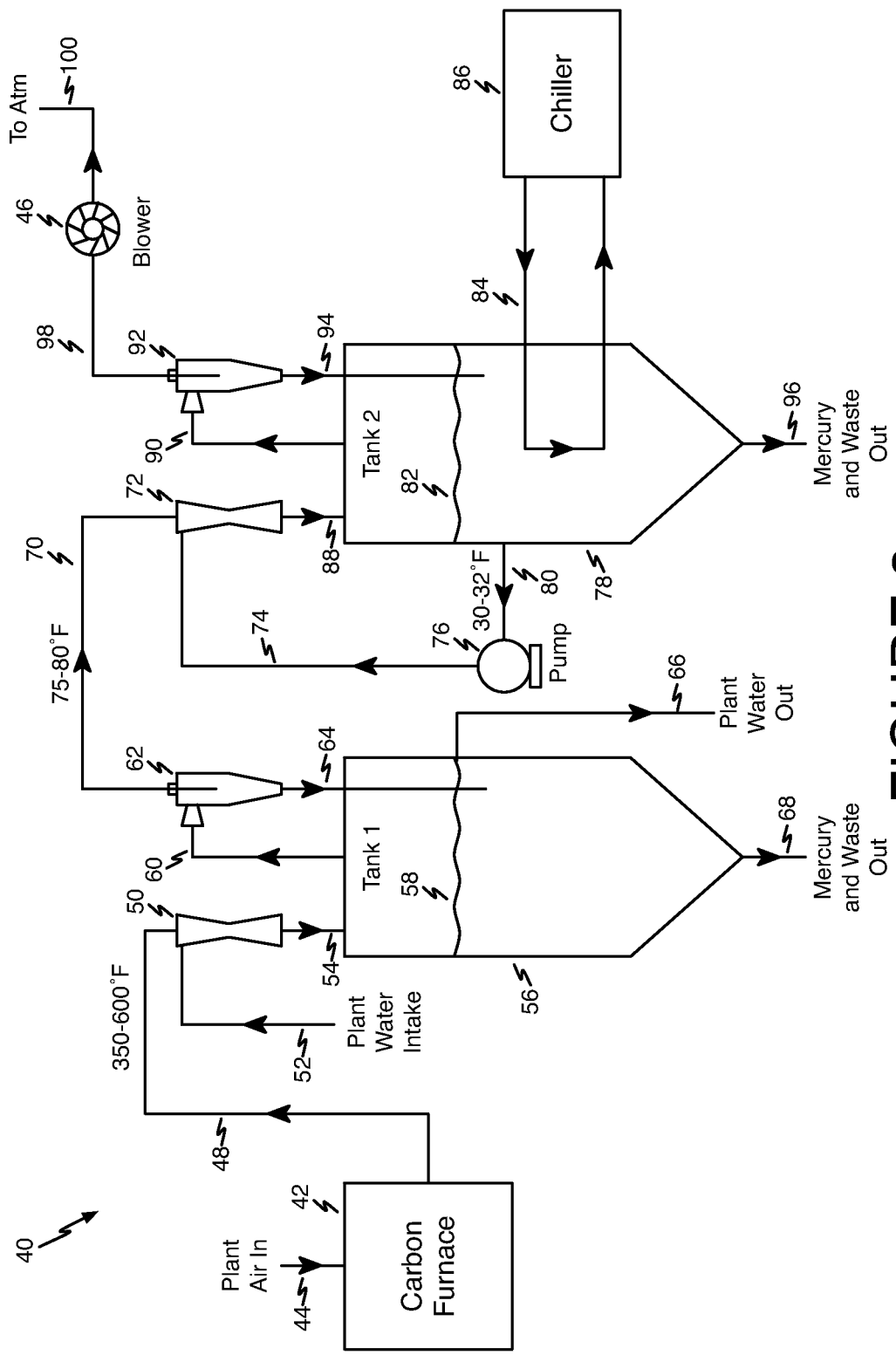
FIG. 2 is a diagram showing an illustrative activated carbon scrubbing system in accordance with the present invention.

Referring now to FIG. 2, a diagram shows an illustrative activated carbon scrubbing system 40 in accordance with the present invention. Persons of ordinary skill in the art will appreciate that, while the embodiment described with reference to FIG. 2 pertains to removal of mercury from activated carbon, the removal system disclosed can be employed to remove other substances from activated carbon as well as from other combustible substrate materials.

Carbon scrubbing system 40 includes downdraft bed furnace 42, which may be configured as shown in FIG. 1. The activated carbon material or other material to be scrubbed is placed in the furnace bed and ignited. Intake air, indicated at reference numeral 44, is pulled into the downdraft bed furnace 42 by blower 46. Gaseous combustion products from the downdraft bed furnace 42, which may be at a temperature of between about 350° to about 600° F. depending on the composition and fineness of the carbon and the composition of the non-combustible impurities, are pulled in pipe 48 to first venturi 50 where they are mixed with ambient temperature water from water intake 52 introduced circumferentially into the first venturi 52. First venturi 52 is configured to drop the temperature of the gasses from the high furnace exit temperature to a temperature in the range of about 75° to about 85° F. In one non-limiting example, first venturi 50 includes a straight section 4 inches in diameter and 8.5 inches long, linearly tapering to a diameter of 2 inches over a 5 inch distance, followed by another linearly expanding section expanding to a 4 inch diameter over a 5 inch distance. Design of a venturi for a desired temperature drop for a given gas flow and water flow rate is a matter of exercise of ordinary skill in the art.

The cooled gasses are delivered by pipe 54 to a first tank 56. First tank 56 is filled with the water exiting the first venturi 50 to a level indicated by reference numeral 58. The cooled gasses are drawn through pipe 60 and introduced circumferentially into first cyclone 62, where centrifugal force forces the finely-divided water component to collide with the outer wall and condense. The water is drawn back into the first tank 56 through pipe 64, which terminates at a point below the water level in the first tank 56. Outlet pipe 66 maintains the water level in first tank 56. Any condensed or solidified waste may be removed from the first tank 56 through pipe 68.

The separated and cooled gaseous component is drawn up into pipe 76 which extends down into first cyclone 62 below its top end, and pulled into second venturi 72 where it is mixed with chilled water from pipe 74 pumped by pump 76 from second tank 78 through pipe 80. Second tank 78 is filled with water to a level indicated by reference numeral 82. The design of second venturi 72 is similar to that of first venturi 50. The water in second tank 78 is chilled by heat exchange coils 84 coupled to chiller 86. Chiller 86 is thrermostatically controlled to maintain the water in the second tank at a temperature of between about 30° to about 32° F. or as cold as 28° or less. Where the temperatures in the second tank are close to the freezing temperature of water, the second tank may use a brine solution. A heat exchange liquid such as ethylene glycol may be employed. The temperature drop in the second venturi 72 is about 48° to about 50° F., and is sufficient to condense the mercury or other vapor fractions drawn from the downdraft furnace 42.

The cooled gasses are delivered to the second tank 78. Second tank 78 is filled with the water exiting the second venturi 72 through pipe 88. The cooled gasses are drawn through pipe 90 and introduced circumferentially into second cyclone 92, where centrifugal force forces the finely-divided water component to collide with the outer wall and condense. The water is drawn back into the second tank 78 through pipe 94, which terminates at a point below the water level in the first tank 56. Any remaining condensed or solidified waste may be removed from the second tank 78 through pipe 96.

The exhaust air from second tank 78 is virtually free of combustion components and is drawn up into pipe 76 which extends down into first cyclone 62 below its top end, and is pulled by blower 46 and vented into the atmosphere by vent pipe 100. In a typical embodiment of the invention, the exhaust air may be at a temperature of about 32°

The entire system may be built in an integrated modular fashion, and can be made small enough to be shipped as an integral unit using commercial shipping container or flatrack equipment.

Figure 3:
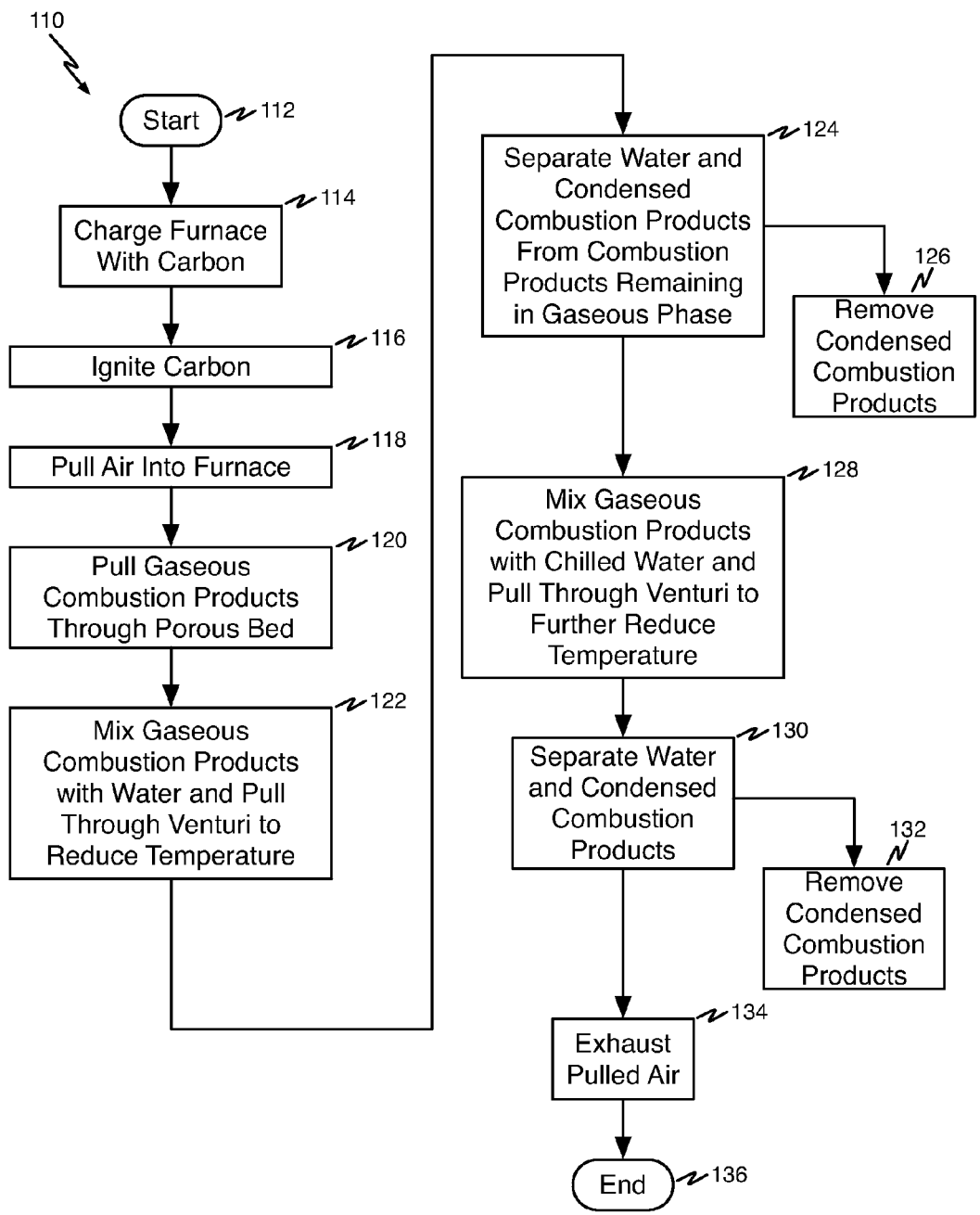
FIG. 3 is a flow diagram illustrating an illustrative process in accordance with the present invention.

Referring now to FIG. 3, a flow diagram illustrating an illustrative process 110 in accordance with the present invention. In an exemplary embodiment, process 110 removes adsorbed mercury from activated carbon, but, from the disclosure of the present invention, persons of ordinary skill in the art will understand that other substances can be removed from activated carbon or other combustible materials.

The process begins at reference numeral 112. At reference numeral 114, the furnace is charged with activated carbon or other material from which substances are to be removed. At reference numeral 116 the activated carbon or other material is ignited and air is pulled into the furnace at reference numeral 118.

At reference numeral 120, the gaseous combustion products are pulled through the porous furnace bed. At reference numeral 122, the gaseous combustion products are mixed with water and pulled through a venturi to reduce their temperature. At reference numeral 124, the water and condensed combustion products are separated from the combustion products remaining in the gaseous phase. At reference numeral 126, a process which may be performed periodically, the condensed combustion products are removed from the system.

At reference numeral 128, the remaining gaseous combustion products are mixed with water and pulled through a second venturi to further reduce their temperature. At reference numeral 130, the water and condensed combustion products are separated. At reference numeral 132, a process which may be performed periodically, the final condensed combustion products are removed from the system.

At reference numeral 134, the exhaust air is pulled from the system and may be vented to the atmosphere or further filtered if necessary. The process ends at reference numeral 136. Persons of ordinary skill in the art will appreciate that the process 110 may be a continuous process if a continuous-loading furnace is employed.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A device for the roasting of spent activated carbon, waste sludges, or other organic wastes, comprising:
    a downdraft bed furnace at the head or feed end of the system; a first adsorber unit fluidly coupled to the furnace and including a closed tank of adsorber process solution, with a venturi scrubber and a cyclone separator coupled to the tank such that gases are sucked into the venturi then through the cyclone separator, the liquid effluents from the scrubber and separator falling by gravity into the tank;
    a second adsorber unit fluidly coupled to the first adsorber unit and including a closed tank of adsorber liquid, with a venturi scrubber and a cyclone separator coupled to the tank such that gases are sucked into the venturi then through the cyclone separator, the liquid effluents from the scrubber and separator falling by gravity into the tank, the second adsorber unit configured to remove impurities not removed in the first unit; and
    an exhaust fan or blower fluidly coupled to the second adsorber unit and configured to pull air into the furnace, through the first and second adsorber units.

2. The device of claim 1 wherein the first adsorber unit is operated with a continuous flow of process solution in order to lower the temperature of the process gas stream from the high temperature of combustion in the furnace to a temperature below 100 C.

3. The device of claim 2, wherein the first adsorber unit is operated with a continuous flow of process solution in order to lower the temperature of the process gas stream from the high temperature of combustion in the furnace to a temperature below 40 C.

4. The device of claim 1 wherein the process solution is selected from water, chemical solution, and other inorganic or organic liquid.

5. The device of claim 1, wherein the second unit is operated with a recycle stream of cold brine, such that the temperature of the process gas stream leaving the second unit is low enough so that the vapor pressure of components to be removed is within the limits for atmospheric discharge of gases.

6. The device of claim 5, wherein the brine is maintained at a temperature between −10 and 0 degrees C., thereby controlling the vapor pressure of mercury in the gas stream.

7. A device for the control of mercury vapor discharge from an industrial process gas stream having an initial mercury level exceeding a preselected limit, the device comprising an adsorber unit including a venturi scrubber and cyclone separator coupled to a receiving tank and operating with a chilled brine stream at a temperature between −30 and +15 degrees C., but preferably between −10 and +5 degrees C., such that the brine is in intimate contact with the gas stream to simultaneously chill the gas stream and make gas-liquid contact to remove mercury vapors.

8. The device of claim 7 further including an upstream adsorber unit in series with the adsorber unit to pre-condition the gas stream.

* * * * *